UNITED STATES PATENT OFFICE 2,425,890

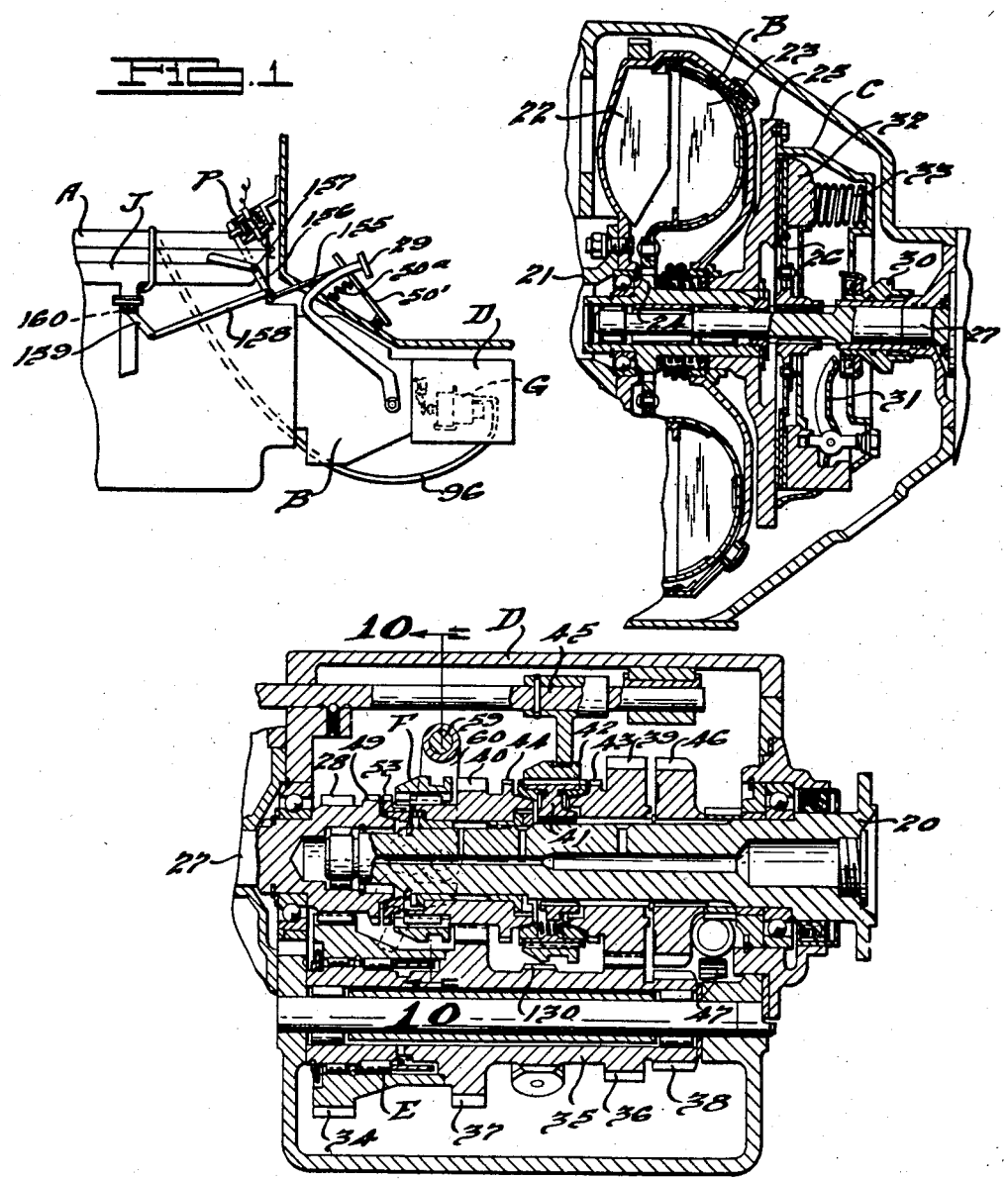

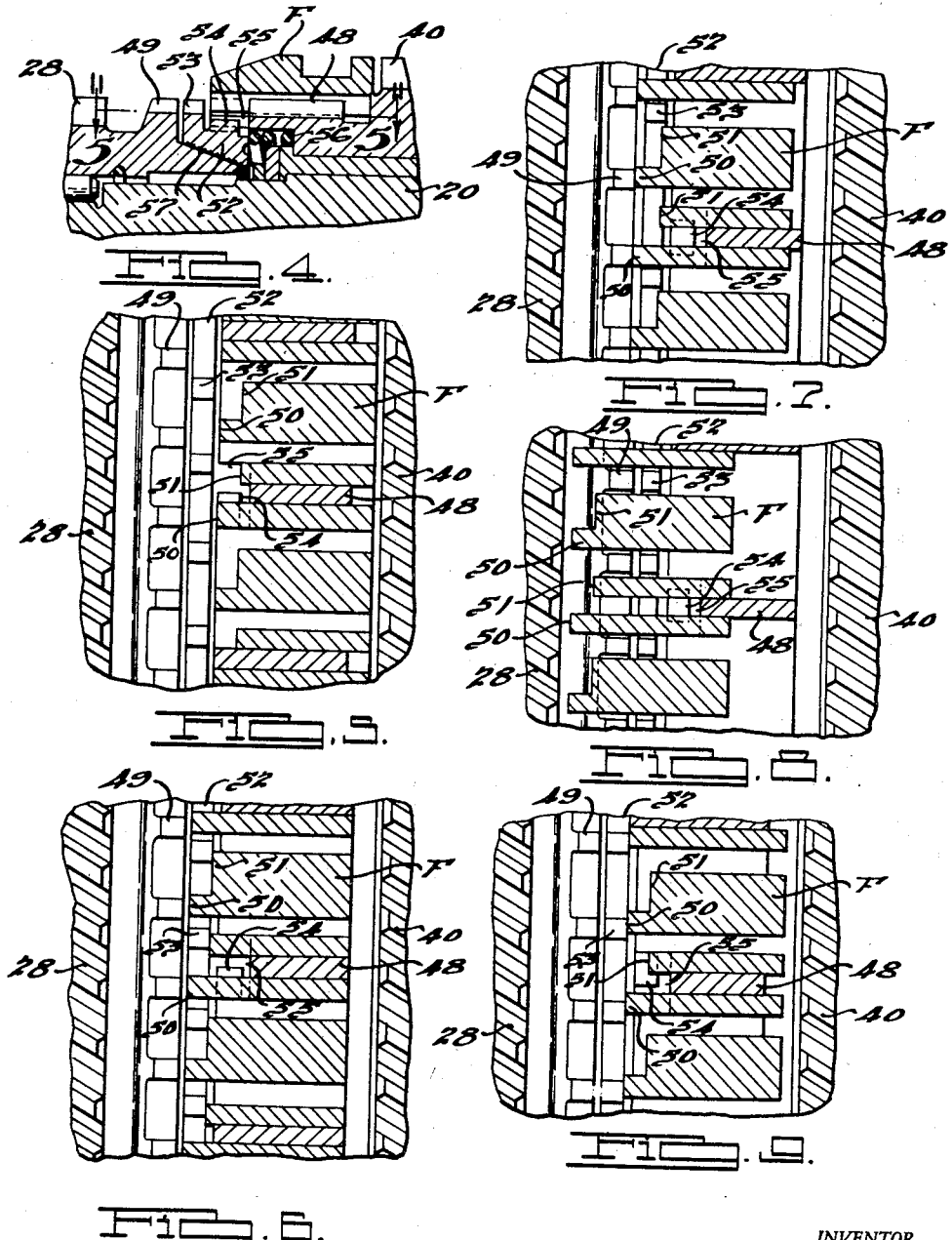

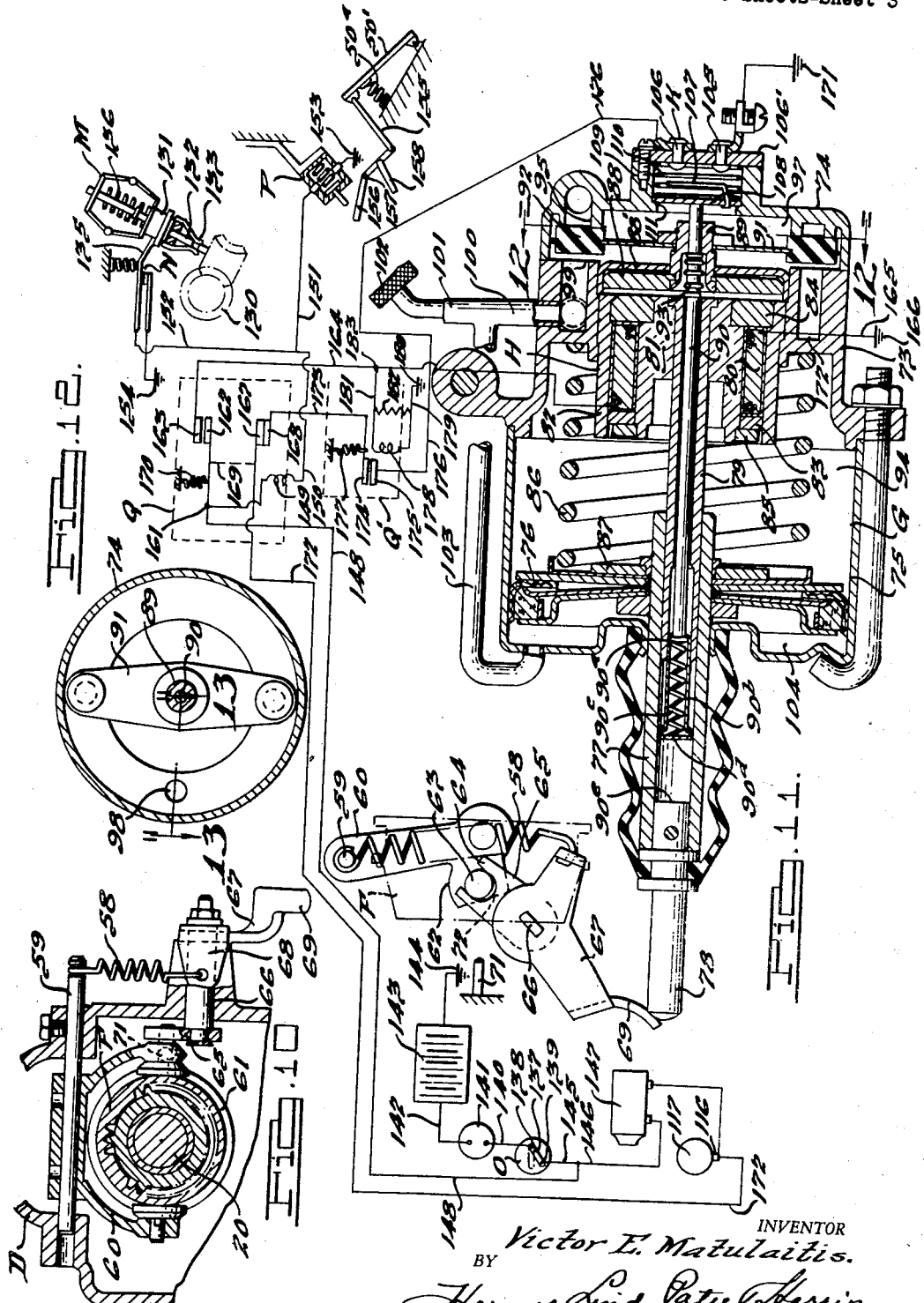

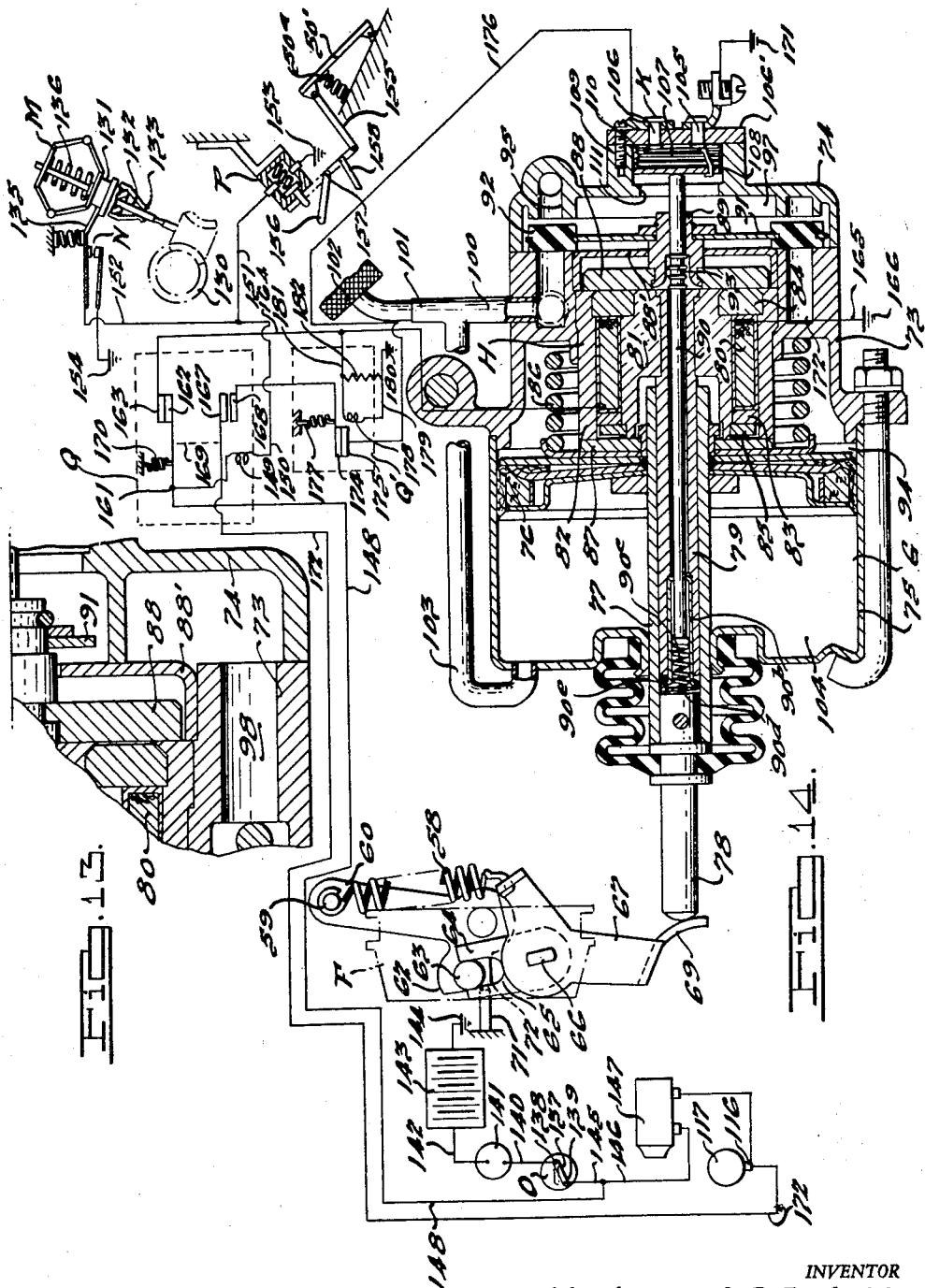

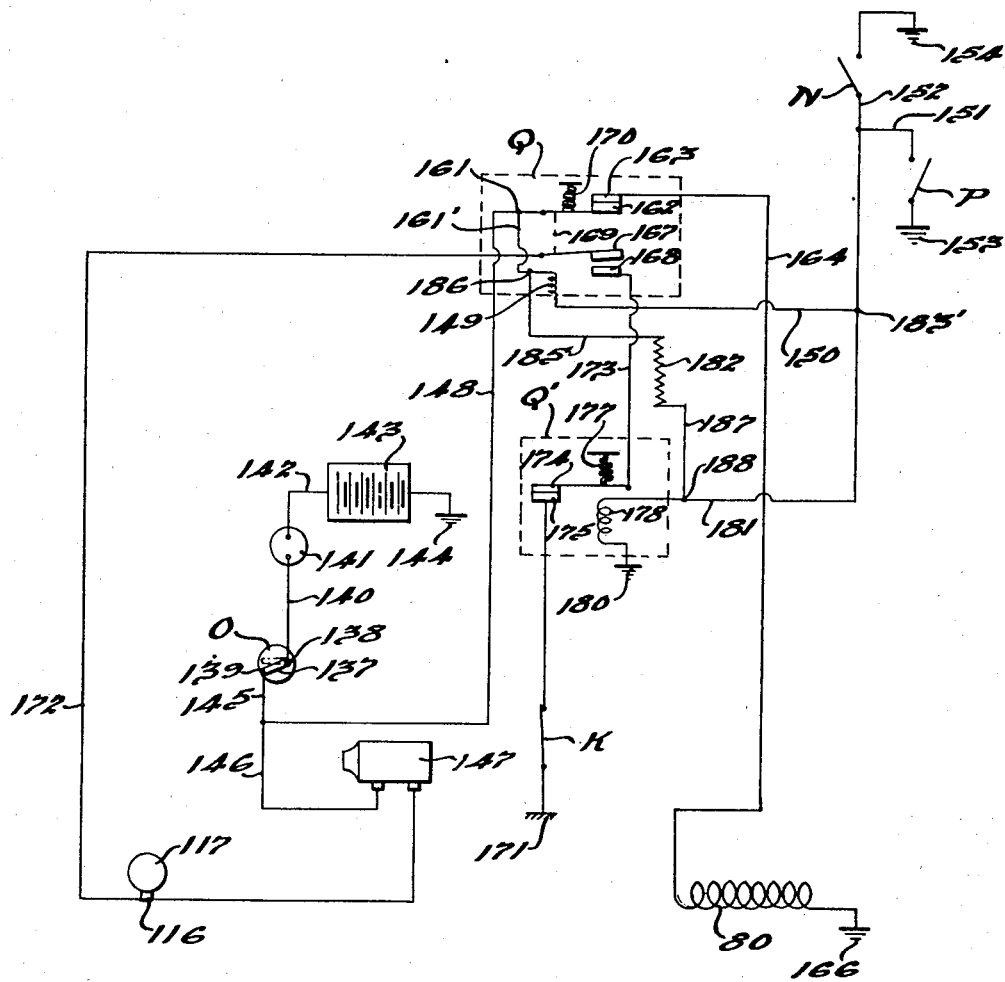

POWER TRANSMISSION CONTROL MEANS

Victor E. Matulaitis, Detroit, Mich., assignor to Chrysler Corporation, Highland Park, Mich., a corporation of Delaware Application September 11, 1941, Serial No. 410,394

17 Claims. (Cl. 74—472)

This invention relates to motor vehicles and refers more particularly to power transmission and control mechanism therefor.

My invention has particular reference to transmission systems in which the torque load is relieved, as by momentary interruption of the engine ignition or by other suitable means, in order to unload positively engageable drive control elements so as to facilitate disengagement of such elements. One example of such a transmission is described and claimed in the copending application of Carl A. Neracher et al., Serial No. 335,310 filed May 15, 1940.

It is an object of my invention to provide improved ignition interruption control means adapted for use with a transmission control of the general type aforesaid and which is capable of being employed in a parallel arrangement of kickdown and governor switches without resulting in engine missing or ignition interruption on the return stroke of the piston or other prime mover operator, such interruption occurring only at the desired time to facilitate relative disengagement of the drive control elements.

Another object is to provide improved and simplified means for controlling the torque-relieving or torque reversing means.

Another object is to provide a transmission control which is more fool-proof in its operation and in the general drive functions of the vehicle.

A further object is to provide an improved prime mover and ignition interrupter switch assembly for controlling shift of a shiftable drive control element.

A still further object is to provide improved control means for the torque-relieving means whereby the torque relief is brought about only as an incident to the one desired direction of movement of the actuating means for the movable or shiftable drive control element and not during the return direction of movement of this actuating means.

Another object is to provide a simple electrical system for controlling ignition interruption, my system accommodating use of a simple and cheap flat strip type interrupter switch of the well known door bell type.

A further object is to provide a novel electrical system incorporating relay means for protecting the ignition against interruption at times other than when desired.

Another object is to provide an improved electrical system incorporating relay means so arranged as to protect the ignition grounding wire against a "hot" lead at the prime mover unit and at the interrupter switch during vehicle drives when the drive control elements are disengaged as well as when engaged. Inasmuch as the relay means may be located at any desired point, as at the instrument panel where it is protected, there is therefore no likelihood of the ignition becoming grounded by accumulation of dirt at the interrupter switch at times when it is desired to maintain the engine in constant firing condition.

A still further object is to provide an improved operating means for maintaining the ignition grounded out for a predetermined portion of the release stroke of the movable drive control element, such operating means being so arranged as not to interfere either with the moving parts of the releasing means or the interrupter switch.

A further object is to provide means for insuring against the ignition being grounded out for a period of time longer than desired.

Another object is to provide a novel system of transmission and ignition interruption control incorporating a time delay relay for the ignition interrupter switch such that the ignition is automatically restored if the ignition tends to be interrupted beyond a predetermined desired length of time.

Further objects of my invention include the provision of an improved control means according to the aforesaid objects, wherein the governor switch and kickdown switch are arranged in parallel circuits rather than in series circuits as set forth in my copending application Serial No. 405,949 filed August 8, 1941 and which has eventuated in Patent No. 2,309,468, dated January 26, 1943. In my copending application the governor and kickdown switches are arranged in series and selectively open for directing transmission step-down and close for step-up. However, it is sometimes desirable to incorporate my improvements for control systems wherein the governor and kickdown switches are of the type which close for step-down. The latter system of switches is at present employed in automobiles of commercial manufacture. In order to utilize certain of the benefits of the improvements set forth in my copending application it would be necessary to re-design the governor and kickdown switches in order to reverse their functions and this entails several undesirable elements including additional cost. One object of my subject application is therefore to provide a novel control system which will utilize the advantages of the system set forth in my copending application and which is adaptable to control systems wherein the governor and kickdown switches or either of such switches may be of the aforesaid commercial form without requiring their redesign.

My invention is further characterized, especially in one embodiment thereof, by the provision of a novel time delay relay control for ignition interruption wherein this relay control is not affected by the resistance of the kickdown or governor switches so that even if these switches become pitted the relay control will afford a proper ground for the ignition interrupting system.

My invention is further characterized, especially in another embodiment thereof, by the provision of relay control means for ignition interruption with time delay wherein resistance of the relay coil circuit is minimized during tme delay action thereby affording a time delay of relatively long duration and drawing a relatively small amount of current from the battery during drive in the top gear which is used for most of the vehicle driving conditions.

Further objects and advantages of my invention reside in the novel combination and arrangement of parts more particularly hereinafter described and claimed, reference being had to the accompanying drawings in which:

Fig. 1 is a side elevational view showing the motor vehicle engine and power transmission.

Fig. 2 is a longitudinal sectional elevational view through the main clutching mechanism.

Fig. 3 is a similar view through the change speed transmission.

Fig. 4 is a detail enlarged view of the blocker clutch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the drive blocking condition.

Fig. 7 is a similar view showing the automatic clutching sleeve in its coasting relationship for the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a sectional elevational view taken approximately as indicated by line 10—10 in Fig. 3 but showing only the upper portion of the transmission mechanism and particularly the lever operating mechanism for the automatic clutching sleeve.

Fig. 11 is a diagrammatic view of the control mechanism for the automatic clutching sleeve, the latter being shown in its released position.

Fig. 12 is a sectional elevational view taken as indicated by line 12—12 of Fig. 11.

Fig. 13 is a detail enlarged sectional plan view taken as indicated by line 13—13 of Fig. 12.

Fig. 14 is a view generally similar to Fig. 11 but illustrating the parts in positions corresponding to engaged position of the automatic clutching sleeve.

Fig. 15 is a view generally corresponding to Fig. 14 but illustrating a modified arangement of time delay for ignition interruption.

While my control may be employed in conjunction with various types and arrangements of motor vehicle transmissions, especially where a pair of relatively movable positively engageable drive control elements is employed, in order to illustrate one driving system I have shown my invention in connection with certain parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make shifts between neutral, forward, and reverse in transmission D.

Referring to the transmission, pinion 28 is in constant mesh with gear 34 which drives countershaft 35 through an overrunning clutch E of the usual well known type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28, thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 to thereby positively clutch shaft 27 directly to gear 40. The sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50' thereby allowing spring 50ª to close the engine throttle valve and cause the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

During drive in first and third, the speed of shaft 27 exceeds the speed of gear 40 so that, if sleeve F is fully released, the parts will be positioned as in Fig. 5 wherein the blocker teeth 53 are axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

In the event that sleeve F is urged forwardly from its Fig. 5 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manual shiftable sleeve 42. Then on releasing the accelerator pedal the sleeve F will synchronously clutch with teeth 49 during coast to step-up the drive to either second or fourth as aforesaid.

The transmission is provided with prime mover means for controlling shift of sleeve F along with several control means. Referring particularly to Figs. 11 and 14, there is illustrated a pressure fluid operated motor G utilizing differential air pressure for its operation. For convenience this motor is arranged to operate by the "vacuum" in the intake manifold system of the engine under control of electromagnetic means.

Forward shift of sleeve F is effected, under control of motor G, by reason of a spring 58 having its upper end fixed by engaging the outboard portion of a transverse shaft 59 fixed in the housing of transmission D. Mounted to freely rock on shaft 59 is a shift yoke 60 which engages the shift groove 61 of sleeve F, this yoke having one of its arms provided with a forwardly extending lever 62 carrying a lateral pin 63 which engages the yoke portion 64 of an upstanding lever 65. This lever 65 is fixed to the inboard end of a rockshaft 66 the outboard end of which has fixed thereto a bell-crank follower lever member having lever arms 67 and 68. The end of lever 68 is connected to the lower end of spring 58 and lever 67 carries an actuating abutment portion 69.

Spring 58 acts to yieldingly urge engagement of sleeve F, acting through lever 68, shaft 66 and lever 65, to cause pin 63 to swing yoke 60 forwardly on its shaft 59 until, when sleeve F is fully engaged, a stop pin 71 engages the forward flat face 72 of lever 62. This limits rearward swing of lever 67.

The motor G comprises a central body part 73 to which is secured the rear part 74 and the forward cylindrical closure part 75. A piston 76 slidably fits within cylinder 73 and is centrally secured to the rear portion of a hollow reciprocatory leading member or piston rod 77. The forward end of this piston rod carries an abutment leader rod or pin 78 fixed thereto and arranged to engage abutment 69 during its arcuate swing about the axis of shaft 66. The rear end of rod 77 is slidably mounted on a tubular support guide 79 which is part of a fixed assembly H for the coil 80 and inner and outer flux-directing iron cylinders 81, 82 connected by non-magnetic spacers 83, 84. A ferrous ring 85 is arranged with a gap between the front ends of cylinders 81 and 82 to provide a shunt flux path.

Thrusting forwardly on piston 76 is a sleeve-releasing or kickdown spring 86 of much greater force than that of spring 58 so that spring 86 can act to release sleeve F as in Fig. 11. In order to releasably hold the piston in its Fig. 14 position, a plate armature 87 is fixed to the rear face of the piston and adapted to engage the front ends of cylinders 81, 82 to complete the flux path at this point. The electromagnet H is of sufficient strength to hold piston 76 retracted against the force of spring 86.

At the rear of the part 73 there is provided a second plate armature 88 engageable as in Fig. 14 with the rear faces of cylinders 81, 82. A shield 88' is stationary and protects coil 80 against moisture and shields it magnetically. This armature is fixed to a sleeve 89 slidable on a switch operator or rod 90 which extends forwardly through guide 79 and terminates forwardly in a head 90$^a$ for seating the rear end of a spring cup or plunger 90$^b$ which houses a spring 90$^c$. This spring acts between head 90$^a$ and the forward end 90$^d$ of plunger 90$^b$ and with the piston 76 projected forwardly as in Fig. 11, the spring 90$^c$ is substantially unloaded and plunger 90$^b$ is extended forwardly to its limit determined by engagement of the rear inturned end of the sleeve with the rod head 90$^a$. In such position the rear flat face 90$^e$ of leader rod 78 is spaced forwardly from the plunger end 90$^d$. This arrangement provides an overtravel or lost-motion operating connection between rod 90 and piston 76 the purpose of which will be presently more apparent. Sleeve 89 mounts a support 91 carrying a valve member 92, a spring 93 acting between the rear end of the fixed guide 79 and sleeve 89 so as to bias valve member 92 to its Fig. 11 position of shutting off vacuum supply to the cylinder chamber 94 and venting the same.

The part 74 is formed with a valve seat 95 cooperable with valve 92 to control supply of vacuum from pipe 96 (Fig. 1) to chamber 97 in part 74, this chamber being always directly open to the working chamber 94 by a passage 98 as shown in Figs. 12 and 13. Pipe 96 extends forwardly for communication with the vacuum in the engine intake manifold J. The part 73 has a valve seat 99 also cooperable with valve 92 to control venting communication between chambers 94, 97 and vent pipe 100 which has one branch 101 leading to the atmosphere at the air cleaner 102 and a second branch 103 open to the cylinder chamber 104 forwardly of piston 76. It will be apparent that when the electromagnet H is energized, armature 88 will move forwardly to its Fig. 14 position of placing chamber 94 in communication with the intake manifold J, and when the electromagnet is deenergized as in Fig. 11 then spring 93 will bias valve 92 so as to vent chamber 94.

I have provided means functioning to relieve the thrust-application between the teeth of sleeve F and the teeth 49 thereby facilitating movement of the drive control sleeve element F from its Fig. 14 position of engaging relationship into its Fig. 11 position of disengaging relationship with respect to teeth 49. This relief means is in the form of a system of grounding the primary terminal of the usual distributor of the engine ignition system whereby the engine ignition may be momentarily rendered inoperative thereby unloading the torque at sleeve F sufficiently to insure its release by spring 86.

The interrupting system comprises an interrupter switch K preferably of the well known door-bell type having switch terminals 105, 106 carried by the closure plate 106'. These terminals are adapted to be bridged for switch closing function by a spring flat conductor 107 carried by an insulating disk 108 which is slidable in a cylindrical recess 109 of the part 74. A spring 110 acts between plate 106' and disk 108 to bias conductor 107 into switch-open position as in Fig. 11, a shoulder 111 limiting forward movement of the disk.

The arrangement is such that when piston 76 is retracted by vacuum from its Fig. 11 position to its Fig. 14 position, the face 90$^e$ strikes plunger end 90$^d$ and compresses spring 90$^c$ until rod 90 is moved rearwardly overcoming spring 110 and moving disc 108 rearwardly to close switch K. The last portion of the rear movement of piston 76 is accommodated by the overtravel spring 90$^c$ whereby the plunger 90$^b$ moves rearwardly relative to rod 90 until the parts reach their Fig. 14 position at which time the electromagnet H will hold the piston in such retracted position irrespective of the continuance of vacuum in chamber 94. The overtravel spring allows the switch K to close ahead of seating of armature 87 at the coil of the electromagnet and thereby also allows the switch K to remain closed during the first part of the forward or outward movement of the piston.

As will be presently more apparent, ignition interruption is under relay control such that the ignition is not necessarily grounded when switch K is closed as in Fig. 14. However when piston 76 starts its outward stroke, the ignition is at such time interrupted and will ordinarily remain interrupted until switch K opens. Thus the time of interruption may be as long as desired by relatively proportioning the forces exerted by springs 90$^c$ and 110 as well as the arrangement of spacing of the face 90$^e$ and plunger 90$^d$ and other variables as will be readily understood. In practice I have found that an interruption of about one-third of the outward piston stroke is satisfactory for the arrangement illustrated and accordingly the illustrated parts are so arranged that switch K will open at about one-third of the piston stroke in moving from the Fig. 14 position to the Fig. 11 position.

In order to effect disengaging shift of sleeve F, the parts being positioned as in Fig. 14 with switch K closed, the electromagnet is de-energized with accompanying grounding of the ignition by relay control, whereupon spring 93 moves valve 92 to its Fig. 11 venting position. With the chamber 94 vented, spring 86 is then free to move piston 76 forward which it does because the ignition is interrupted and the torque thereby relieved at the teeth of sleeve F. After the piston has completed about one-third of its stroke, the switch K opens by its spring 110, which is at that time able to push rod 90 forward against the unloaded spring 90c, and the ignition is restored for the remainder of the forward piston stroke because the grounding line of the ignition is broken at switch K.

When piston 76 moves from its Fig. 11 position to its Fig. 14 position, switch K closes during the latter part of the piston travel as aforesaid but the ignition is not thereby grounded or interrupted because of the relay control. Thus there is no engine missing during the engaging movement of sleeve F corresponding to inward travel of the piston.

It is deemed preferable to provide a speed control on the energization of the electromagnetic coil 80 so as to insure automatic release of sleeve F below a predetermined car speed and to accommodate automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 130 is a governor M of any suitable type, this governor operating a sleeve 131 outwardly along its drive shaft 132 as the car speed reaches a predetermined point, the break-away being under control of a detent 133 if desired. I use the term "governor" in a broad sense to define speed responsive means of any suitable type.

The sleeve 131 has a shoulder 134 engaged by the swinging switch piece 135 of the governor switch N. When the car is stationary the detent 133 is engaged and switch N is closed. As the car accelerates, the governor eventually reaches its critical speed and detent 133 releases thereby causing switch N to open. As the car slows down, the governor spring 136 restores the parts to the Fig. 11 position and by proportioning the various parts it is obvious that switch N may be made to function at desired speeds proportionate to car travel. As an example of one arrangement of governor operation and gearing arrangement, the governor may be made to open switch N during car acceleration in first and third respectively at approximately 7 and 15 M. P. H. (miles per hour), the switch N closing on stopping the car in direct and second at approximately 7 and 3 M. P. H. respectively.

The driver operated ignition switch is designated at O and comprises a conductor 137 which, in the Fig. 11 position showing the switch "on" or closed, electrically connects contacts 138 and 139. Contact 138 extends by conductor 140 to ammeter 141 and thence by conductor 142 to the usual storage battery 143 and thence to ground 144. Contact 139 has a conductor 145 extending by conductor 146 branching therefrom to the engine ignition system herein shown in part as comprising coil 147 and distributor 117 having the primary terminal 116.

A second conductor 148 branches from conductor 145 to the coil 149 of the single throw double pole relay Q, thence by conductor 150 to the branch conductors 151, 152. The branch 151 extends to the kickdown switch P and thence to ground 153. Branch 152 extends to the governor switch N and thence to ground 154. The switch P is normally open and is closed preferably by a full depression of accelerator pedal 50′ acting through link 155 and a bell-crank lever 156 pivotally mounted at 157. Lever 156 actuates a link 158 which extends forwardly (Fig. 1) to adjust the engine throttle valve lever 159. When pedal 50′ is thus depressed, the lever 159 is positioned to fully open the throttle valve 160 and as the throttle valve is adjusted in its wide-open range the lever 156 closes switch P to effect a step-down in the transmission from fourth to third or from second to first by de-energizing the coil 80 by reason of relay control.

Switches P and N are in parallel circuits, each of which includes relay coil 149. The kickdown relay coil circuit is as follows: ground 144 to battery 143 thence by conductor 142 to ammeter 141 and by conductor 140 to ignition switch O. From switch O this circuit extends through conductors 145 and 148 to relay coil 149 and thence by conductors 150 and 151 through switch P, when closed, to ground 153 to complete the circuit. The governor relay coil circuit is the same as the kickdown relay coil circuit as far as conductor 150 whence this circuit extends by conductor 152 through governor switch N, when closed, to ground 154.

The holding coil circuit is the same as the kickdown relay coil circuit and the governor relay coil circuit to conductor 148 whence it branches at point 161, ahead of coil 149, and extends to the movable secondary relay point 162 of relay Q, thence to the companion fixed secondary relay point 163 and by conductor 164 to one end of coil 80, the other end being connected by conductor 165 to ground at 166.

Relay Q comprises a set of primary points 167, 168. The point 167 is tied at 169 to always move with point 162 such that when points 162, 163 are open then points 167, 168 are closed and vice versa. A spring 170 biases the primary and secondary relay points to their positions illustrated in Fig. 14, the relay coil 149 being then de-energized. However, when coil 149 is energized then the relay points are positioned as in Fig. 11. It will be apparent that when either the governor switch N or kickdown switch P is closed then coil 1—49 is energized by closing either the governor relay coil or the kickdown relay coil parallel circuits. Energizing relay coil 149, as in Fig. 11, causes primary points 167, 168 to close and secondary points 162, 163 to open. When points 162, 163 are open then the holding coil circuit is broken and holding coil 80 is deenergized to vent chamber 94 and allow spring 86 to move piston 76 outwardly to the Fig. 11 position. On the other hand, when switch N opens, the parts being as in Fig. 11, then the governor relay coil circuit is broken and relay coil 149 is de-energized. Spring 170 then acts to close points 163, 163 to establish the holding coil circuit whereby the electromagnet H is energized causing vacuum retraction of piston 76 to its Fig. 14 position where it is held by armature 87. The primary points 167, 168 immediately open when switch N opens so that by the time switch K closes, near the end of retraction of piston 76, there will be no engine missing because the ignition grounding circuit, as will presently be apparent, between terminal 116 and the ground 171 for terminal 105 of switch K will be open at the relay points 167, 168.

The ignition interrupting system comprises an ignition grounding line or circuit which includes a grounding conductor 172 extending from the distributor primary terminal 116 to the primary relay terminal 167 thence to terminal 168 and conductor 173 to the movable point 174 of a time delay relay Q'. From point 174 this ignition grounding circuit continues through the companion fixed point 175 thence by conductor 176 through switch K, when closed, to ground 171. The movable point 174 is biased by a spring 177 into disengagement with respect to the companion point 175. Engagement of point 174 with point 175 is effected by a relay coil 178 one end of which extends by a conductor 179 to ground at 180 while the other end of this relay coil is connected by a conductor 181 at point 183 with conductor 164 of the holding coil circuit. Extending across conductors 179, 181 is a resistance 182. As a typical example of the ohmic values of the relay coils 149, 178 and resistance 182 in an installation of the character illustrated, using an ordinary commercial vehicle storage battery 143, the coil 149 may have around 20 to 24 ohms resistance, coil 178 around 50 ohms, and resistance 182 about 10 ohms. These values may of course be varied within limits which insure the proper functioning of the system. For convenience of reference, the relay Q may be referred to as the primary relay and relay Q' as the secondary or time delay relay, it being noted that points 174, 175 are in series with points 167, 168 in the ignition grounding circuit.

The operation of the relay control system is as follows. When the vehicle is being driven with sleeve F engaged with teeth 49, as in second or direct, switches N and P are open as in Fig. 14 thereby de-energizing relay coil 149 and causing relay spring 170 to close points 162, 163. The holding coil circuit is thereby closed causing holding coil 80 to be energized whereby the valving will supply vacuum to the piston chamber 94. At this time current flows from ground 144 and battery 143 to conductors 145, 148 to point 161 thence through primary points 162, 163 and conductors 164, 181 to relay coil 178 and by conductor 179 to ground 180. This circuit which, for convenience, may be termed the secondary relay coil circuit is parallel with the holding coil circuit, from whence it branches at point 183 so that the parallel circuits are each controlled by points 162, 163. When this secondary relay coil circuit is thus established, points 174, 175 of relay Q' are closed and as the interrupter switch K is then closed, the ignition grounding circuit is ready to be closed as soon as points 167, 168 are closed. A further circuit also parallel with the holding coil circuit is established, with the parts as in Fig. 14, this circuit being designated as the secondary relay resistance circuit and is the same as the secondary relay coil circuit up to conductor 181 whence this circuit extends through resistance 182 and conductor 179 to ground 180.

When the system directs disengaging shift of sleeve F accompanied by momentary interruption of the ignition, this kickdown cycle is started by closing either the governor switch N or the kickdown switch P to establish the corresponding governor relay coil circuit or the kickdown relay coil circuit. When this occurs, relay coil 149 is energized to open points 162, 163 and close points 167, 168. When points 162, 163 open the holding coil 80 is de-energized and valve 92 moves to the Fig. 11 position venting chamber 94 and causing spring 66 to thrust piston outwardly to release sleeve F as soon as the ignition is interrupted.

When points 162, 163 open, current through the secondary relay coil circuit and secondary relay resistance circuit is broken because these circuits are open at points 162, 163. At the same time the ignition grounding circuit is established by reason of points 167, 168 closing and the system is such that, in the event the interrupter switch K fails to open after completing about one-third of its kickdown stroke as aforesaid, then the ignition grounding circuit will immediately thereafter automatically be broken to restore the ignition system to normal functioning by breaking the ignition grounding circuit at points 174, 175 which open in any event with time delay of about one-half of a second after points 162, 163 are opened.

This time delay control is brought about because when points 162, 163 open, the resistance 182 provides a return path for inductive current flowing from conductor 164 in two inductive paths one of which is through coil 80 to ground 166 and the other of which is through conductor 181, coil 178, and conductor 179 to ground 180. This return path is from ground 180 through conductor 179 and resistance 182 to conductor 181. Without the resistance 182 the voltages along these two inductive paths would oppose each other and the resulting net current flowing in coil 178, after points 162, 163 are opened, would be too low to maintain points 174, 175 closed and the time delay would be too brief. Thus without the return path provided by resistance 182 there would result only the difference between the voltages in the aforesaid inductive paths, for use as time delay, whereas with my arrangement these voltages add together in the sense that the full inductive voltage across coil 178 is effective in producing the flow of inductive current for the time delay. Now as soon as the time delay cycle has taken place by delay of the inductive current, the spring 177 acts to open points 174, 175 to restore the ignition system if not already restored by the normal functioning of the interrupter switch K.

When, by again opening both switches N and P to deenergize relay coil 149 and energize relay coil 178, points 174 and 175 are closed, piston 76 on returning to its Fig. 14 position to close interrupted switch K, the ignition grounding circuit will not be closed because points 167, 168 will be open.

Switch K is protected against a hot grounding lead because ground wire 176 is broken when the car is driving with sleeve F disengaged when points 174, 175 are open, and when sleeve F is engaged when points 167, 168 are open.

Among the advantages of my time delay relay system is the arrangement whereby the time delay relay Q' is not affected by pitting of the kickdown or governor switches which would increase the resistance at the switches and which might prevent obtaining a good ground. With my system, even if an unusual resistance should develop at either of these switches, the coil 178 of relay Q' has an independent ground control at 180 which insures proper time delay action of relay Q'.

Another advantage is that the arrangement is such that the resistance 182 does not draw any current during vehicle drive when sleeve F is disengaged because points 162, 163 are open thereby breaking the secondary relay resistance circuit. As a corollary to this advantage in the circumstance that full battery current is available for engine starting without current loss through resistance 182 at this critical time.

In the operation of the mechanism, the car at standstill and with ignition switch O closed and the engine idling will cause governor switch N to remain closed as in Fig. 11 thereby establishing the governor relay coil circuit and de-energizing coil 80 even though the kickdown switch P is closed at this time. The parts are then in their Fig. 11 positions with valve 92 seated at 95 so that vacuum at pipe 96 is shut off from chambers 97 and 94 while these chambers are open through seat 99 to vent 100 thereby allowing spring 86 to hold piston 76 and rod 77 forwardly projected and sleeve F' disengaged. Armature 87 is thus positioned forwardly away from coil 80 and armature 88 is positioned rearwardly from the coil but not so far but that it will respond to energization of the coil. Spring 93 acting through sleeve 89 is now acting to hold valve 92 against seat 95 as well as to position armature 88 as in Fig. 11.

The driver now shifts sleeve 42 to either the high or low range and accelerates the car, ordinarily above the critical speed of governor M thereby causing switch N to open and break the governor relay coil circuit. When this occurs the coil 80 is energized by closing of the holding coil circuit at points 162, 163 and armature 88 moves electromagnetically to its Fig. 15 position of magnetic attraction to the electromagnet means 81, 82 the annulus 85 constituting a gap shunt for the electromagnetic circuit at this time.

When armature 88 moves forwardly, valve 92 is caused to seat at 99. The vent 101 is now shut off from chambers 97 and 94, the latter being open to the vacuum in manifold J through pipe 96, chamber 97, and passage 98.

As the vacuum in manifold J is now open to chamber 94, chamber 104 being vented at 103, 101, piston 76 moves rearwardly bringing armature 87 in a position of electromagnetic attraction with respect to cylinders 81, 82 where it is electromagnetically held independently of the presence of vacuum in chamber 94. As soon as the driver allows the engine to coast, sleeve F will engage teeth 49 synchronously under action of spring 58, to step-up the drive to either second or fourth although the step-up will be delayed by the blocker 52 until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor M directs a downshift on bringing the car to rest. Thus there is automatically provided a favorable torque-multiplying gearing for starting, as in third.

On bringing the car to a stop when sleeve F is clutched as in fourth, for example, the governor M closes the switch N to allow spring 86 to release sleeve F which it can do as the car is brought to a stop because of the low coasting torque at the teeth of sleeve F. The interruption of the ignition system at this time does not relieve or reverse the torque at the teeth of the sleeve unless the governor is arranged to close on coast down at a car speed below or about equal to engine idle and such may be readily provided although by providing a spring 86 of proper strength the sleeve F will, in any event, release on car coast to a stop.

Whenever the car is driving in fourth or second above the governor critical speed, a full depression of the accelerator pedal will cause the transmission to step-down to third or first by closing the kickdown relay coil circuit, the transmission step-up back to fourth or second taking place on release of the accelerator pedal with attendant synchronization of sleeve F with teeth 49.

When the accelerator pedal is thus fully depressed for the kickdown, switch P closes thereby causing points 162, 163 to open de-energizing coil 80 whereupon armature 88 moves by spring 93 to shut off the vacuum supply to chamber 94 and to vent this chamber. Switch K being closed and points 174, 175 being closed, as soon as points 167, 168 close, the ignition grounding circuit is completed and the piston 76 is free to move outwardly to release sleeve F because the torque load is relieved by the engine ignition interruption. After the piston completes about one-third of its forward stroke, switch K opens restoring the ignition and allowing the engine to rapidly speed up to pick up the drive in third or first at the overrunning clutch E. Sleeve F disengages fully during the rapid cycle incident to outward movement of piston 76 before the engine has time to impose a drive load on the teeth of sleeve F. Points 174, 175 open with time delay shortly after the normal opening of switch K on kickdown to protect the system as aforesaid.

When the driver releases the accelerator pedal, assuming governor switch N to be open, coil 80 is energized to cause armature 88 to move to its Fig. 14 position causing valve 92 to again supply vacuum to chamber 94, points 167, 168 opening and points 162, 163 and 174, 175 closing. Thereupon piston 76 moves inwardly to its Fig. 14 position, the ignition not being interrupted. As soon as the engine slows down to synchronize the teeth 49 with sleeve F, the latter will then shift forwardly by spring 58 to restore direct drive from pinion 28 to gear 40.

Referring now to Fig. 15 I have illustrated a modified control system which may be employed. This modified system is so arranged that a time delay of somewhat longer duration is obtained with respect to the Fig. 14 system as it eliminates the provision of a resistance in the time delay relay coil circuit during the time delay action. A further advantage over the Fig. 14 arrangement is that the time delay relay control system draws less current, when driving with sleeve F engaged, because with my Fig. 15 system the resistance is no longer subject to direct battery voltage as in the case of the resistance 182 in Fig. 14.

In Fig. 15 ignition grounding circuit, the kickdown relay coil circuit, the governor relay coil circuit, and the holding coil circuit are all identical to the corresponding circuits in Fig. 14 and need not be again described. For simplicity I have represented many of the parts in Fig. 15 diagrammatically but it should be understood that they are intended to be the same as in Fig. 14 as, for example, the switches K, N, and P, and the coil 80 which is shown apart from motor G which may be the same as in Fig. 14.

In Fig. 15 the coils 149, 178 and resistance 182 may have the same ohmic values as in Fig. 14 but now the resistance 182 has one end connected to the battery output as by a conductor 185 connected at point 186 with the conductors 148 and 161' leading from the energy source at battery 143 to coil 149. The other end of resistance 182 extends by conductor 187 to connect at point 188 with the conductor 181 from coil 178 but now this conductor 181 joins the conductor 150 at point 183' at the energy source side of switches N and P in the aforesaid parallel circuits for these switches.

When driving with sleeve F clutched, the electrical parts being as shown in Fig. 15, relay points 174, 175 are maintained closed just as for Fig. 14 by a secondary relay coil circuit which is the same as in Fig. 14 conductor 148 whence this circuit now continues at point 161 to point 186 and conductor 185 to resistance 182, thence by conductors 187, 181 through coil 178 and back to ground at 180. Because the resistance 182 is now in series with coil 178 it will be apparent that less current is consumed in this circuit during drive in second and fourth than for the corresponding circuit for Fig. 14.

When either of switches N or P is closed for the kickdown, the control system functions just as for Fig. 14 except with respect to the time delay for the opening of points 174, 175 for relay Q'. The battery end of coil 178 is now grounded at switch N or P. For example, assuming switch P to close for the kickdown, then the ends of coil 178, instead of being grounded at 180 and 166 as in Fig. 14, are now grounded at 180 and 153 (or at 180 and 154 when switch N closes for the kickdown) so that now the time delay function is dependent on the ground for switch P (or switch N). However while this entails a slight disadvantage over the Fig. 14 arrangement in requiring a good ground at switches N and P (in order to prevent sufficient resistance at these switches so that current will not continue to flow through the secondary relay coil circuit and prevent points 174, 175 from opening with time delay) there results the advantage over Fig. 14 in that resistance 182 does not now tend to dissipate inductive energy during the time delay action and the time delay is consequently advantageously increased in duration.

The inductive circuit is now from relay coil 178 to ground 180 thence from ground 154 (or 153) through switch P (or N) and back to coil 178 by conductor 181.

The overall operation of the Fig. 15 control system is otherwise identical with that set forth for the foregoing embodiment and need not be repeated.

I claim:

1. A power transmission for driving a vehicle having an engine provided with an ignition system and a throttle; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position thereof to a second position thereby to effect operation of said element from its said second position to its said first position, said thrust member being movable in a return direction from its said second position to its said first position to accommodate movement of said element to its said second position; power operating means for moving said thrust member from its said second position to its said first position; electromagnetic means comprising a flux-generating holding coil adapted, when energized, to releasably hold said thrust member in its said first position and, when de-energized, to release said thrust member for movement thereof to its said second position; a spring biasing said thrust member toward its said second position; a governor switch; means for controlling opening and closing of said governor switch as a function of vehicle drive speed such that said governor switch will close in response to bringing the vehicle to rest and will open in response to predetermined speed of drive of the vehicle; a kickdown switch biased to open position; an accelerator pedal for controlling operation of said throttle; means controlled by said pedal for closing said kickdown switch in response to movement of said pedal in throttle-opening direction; an ignition interrupter switch; means operable as a function of movement of said thrust member for controlling said interrupter switch such that said interrupter switch is closed when said thrust member is in its said first position and such that said interrupter switch opens in response to predetermined movement of said thrust member in its said thrust transmitting direction; relay means comprising an energizable controlling relay coil; a pair of parallel arranged electric circuits each including a source of electrical energy and said relay coil, one of said pair of parallel arranged circuits including said governor switch and the other including said kickdown switch; ignition grounding means adapted for control by said relay means and including said interrupter switch; electrical holding coil circuit means adapted for control by said relay means and including said holding coil; said relay means being so constructed and arranged as to function, under control of said relay coil, to control said ignition grounding means and said holding coil circuit means; a time delay relay comprising, a pair of relatively engageable time delay relay points interposed in said ignition grounding means, means biasing said time delay relay points into relative disengaging relation, and an energizable time delay relay coil for effecting relative engagement of said time delay relay points; and circuit means for said time delay relay coil for maintaining said time delay relay points relatively engaged for only an appreciable predetermined time interval in response to closing of either of said governor or kickdown switches.

2. A power transmission according to claim 1; said circuit means for said time delay relay coil comprising, means for grounding one end of said time delay relay coil, means for electrically connecting the other end of said time delay relay coil with said holding coil circuit means, and a resistance grounded at one end electrically connected at its other end to said other end of said time delay relay coil.

3. A power transmission according to claim 1; said circuit means for said time delay relay coil comprising, means for grounding one end of said time delay relay coil, means for electrically connecting the other end of said time delay relay coil with said pair of parallel circuits at the energy source side of said governor and kickdown circuits, and a resistance electrically interposed between said other end of said time delay relay coil and said energy source.

4. A power transmission for driving a vehicle having an engine provided with an ignition system and a throttle; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position thereof to a second position thereby to effect operation of said element from its said second position to its said first position, said thrust member being movable in a return direction from its said second position to its said first position to accommodate movement of said element to its said second position; power operating means for moving said thrust member from its said second position to its said first position; electromagnetic means comprising a flux-generating holding coil adapted, when energized, to releasably hold said thrust member in its said first position and, when de-energized, to release said thrust member for movement thereof to its said second position; a spring biasing said thrust member toward its said second position; a governor switch; means for controlling opening and closing of said governor switch as a function of vehicle drive speed such that said governor switch will close in response to bringing the vehicle to rest and will open in response to predetermined speed of drive of the vehicle; a kickdown switch biased to open position; an accelerator pedal for controlling operation of said throttle; means cntrolled by said pedal for closing said kickdown switch in response to movement of said pedal in throttle-opening direction; an ignition interrupter switch; means operable as a function of movement of said thrust member for controlling said interrupter switch such that said interrupter switch is closed when said thrust member is in its said first position and such that said interrupter switch opens in response to predetermined movement of said thrust member in its said thrust transmitting direction; a double pole relay comprising a pair of primary points and a pair of secondary points, one of the points of each pair being movable between positions of engagement and disengagement relative to the other point of such pair, said movable points being connected such that said pair of primary points is relatively engaged when said pair of secondary points are relatively disengaged and vice versa, a relay spring biasing said movable points to one of their positions aforesaid; and a relay coil adapted when energized to effect movement of said movable points to the other of their positions aforesaid; a pair of parallel arranged electric circuits each including a source of electrical energy and said relay coil, one of said pair of parallel arranged circuits including said governor switch and the other including said kickdown switch; ignition grounding means including said interrupter switch and one of said pairs of relay points; electrical holding coil circuit means including said holding coil and the other of said pairs of relay points; a time delay relay comprising, a pair of relatively engageable time delay relay points interposed in said ignition grounding means, means biasing said time delay relay points into relative disengaging relation, and an energizable time delay relay coil for effecting relative engagement of said time delay relay points; and circuit means for said time delay relay coil for maintaining said time delay relay points relatively engaged for only an appreciable predetermined time interval in response to closing of either of said governor or kickdown switches.

5. A power transmission according to claim 4; said circuit means for said time delay relay coil comprising, means for grounding one end of said time delay relay coil, means for electrically connecting the other end of said time delay relay coil with said holding coil circuit means, and a resistance grounded at one end and electrically connected at its other end to said other end of said time delay relay coil.

6. A power transmission according to claim 4; said circuit means for said time delay relay coil comprising, means for grounding one end of said time delay relay coil, means for electrically connecting the other end of said time delay relay coil with said pair of parallel circuits at the energy source side of said governor and kickdown circuits, and a resistance electrically interposed between said other end of said time delay relay coil and said energy source.

7. A power transmission for driving a vehicle having an engine provided with an ignition system and a throttle; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position thereof to a second position thereby to effect operation of said element from its said second position to its said first position, said thrust member being movable in a return direction from its said second position to its said first position to accommodate movement of said element to its said second position; power operating means for moving said thrust member from its said second position to its said first position; electromagnetic means comprising a flux-generating holding coil adapted, when energized, to releasably hold said thrust member in its said first position and, when de-energized, to release said thrust member for movement thereof to its said second position; a spring biasing said thrust member toward its said second position; a governor switch; means for controlling opening and closing of said governor switch as a function of vehicle drive speed such that said governor switch will close in response to bringing the vehicle to rest and will open in response to predetermined speed of drive of the vehicle; a kickdown switch biased to open position; an accelerator pedal for controlling operation of said throttle; means controlled by said pedal for closing said kickdown switch in response to movement of said pedal in throttle-opening direction; an ignition interrupter switch; means operable as a function of movement of said thrust member for controlling said interrupter switch such that said interrupter switch is closed when said thrust member is in its said first position and such that said interrupter switch opens in response to predetermined movement of said thrust member in its said thrust transmitting direction; a double pole relay comprising a pair of primary points and a pair of secondary points, one of the points of each pair being movable between positions of engagement and disengagement relative to the other point of such pair, said movable points being connected such that said pair of primary points is relatively engaged when said pair of secondary points are relatively disengaged and vice versa, a relay spring biasing said movable points to one of their positions aforesaid tending to effect disengagement of said pair of primary points and engagement of said pair of secondary points, and a relay coil adapted when energized to effect movement of said movable points to the other of their positions aforesaid thereby to effect engagement of said pair of primary points and disengagement of said pair of secondary points; a pair of parallel arranged electric circuits each including a source of electrical energy and said relay coil, one of said pair of parallel arranged circuits including said governor switch and the other including said kickdown switch; ignition grounding means including said interrupter switch and said pair of primary points; electrical holding coil circuit means including said holding coil and said pair of secondary points; a time delay relay comprising, a pair of relatively engageable time delay relay points interposed in said ignition grounding means, means biasing said time delay relay points into relative disengaging relation, and an energizable time delay relay coil for effecting relative engagement of said time delay relay points; and circuit means for said time delay relay coil for maintaining said time delay relay points relatively engaged for only an appreciable predetermined time interval in response to closing of either of said governor or kickdown switches.

8. A power transmission for driving a vehicle having an engine provided with an ignition system; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position thereof to a second position thereby to effect operation of said element from its said second position to its said first position, said thrust member being movable in a return direction from its said second position to its said first position to accommodate movement of said element to its said second position; power operating means for moving said thrust member from its said second position to its said first position; electromagnetic means comprising a flux-generating holding coil adapted, when energized, to releasably hold said thrust member in its said first position and, when deenergized, to release said thrust member for movement thereof to its said second position; a spring biasing said thrust member toward its said second position; a governor switch; means for controlling opening and closing of said governor switch as a function of vehicle drive speed such that said governor switch will close in response to bringing the vehicle to rest and will open in response to predetermined speed of drive of the vehicle; an ignition interrupter switch; means operable as a function of movement of said thrust member for controlling said interrupter switch such that said interrupter switch is closed when said thrust member is in its said first position and such that said interrupter switch opens in response to predetermined movement of said thrust member in its said thrust transmitting direction; relay means comprising an energizable controlling relay coil; a governor relay coil circuit including a source of electrical energy, said relay coil, and said governor switch; ignition grounding means adapted for control by said relay means and including said interrupter switch; electrical holding coil circuit means adapted for control by said relay means and including said holding coil; said relay means being so constructed and arranged as to function, under control of said relay coil, to control said ignition grounding means and said holding coil circuit means; a time delay relay comprising, a pair of relatively engageable time delay relay points interposed in said ignition grounding means, means biasing said time delay relay points into relative disengaging relation, and an energizable time delay relay coil for effecting relative engagement of said time delay relay points; and circuit means for said time delay relay coil for maintaining said time delay relay points relatively engaged for only an appreciable predetermined time interval in response to closing of said governor switch.

9. A power transmission for driving a vehicle having an engine provided with an ignition system and a throttle; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position thereof to a second position thereby to effect operation of said element from its said second position to its said first position, said thrust member being movable in a return direction from its said second position to its said first position to accommodate movement of said element to its said second position; power operating means for moving said thrust member from its said second position to its said first position; electromagnetic means comprising a flux-generating holding coil adapted, when energized, to releasably hold said thrust member in its said first position and, when deenergized, to release said thrust member for movement thereof to its said second position; a spring biasing said thrust member toward its said second position; a kickdown switch biased to open position; an accelerator pedal for controlling operation of said throttle; means controlled by said pedal for closing said kickdown switch in response to movement of said pedal in throttle-opening direction; an ignition interrupter switch; means operable as a function of movement of said thrust member for controlling said interrupter switch such that said interrupter switch is closed when said thrust member is in its said first position and such that said interrupter switch opens in response to predetermined movement of said thrust member in its said thrust transmitting direction; relay means comprising an energizable controlling relay coil; a kickdown relay coil circuit including a source of electrical energy, said relay coil, and said kickdown switch; ignition grounding means adapted for control by said relay means and including said interrupter switch; electrical holding coil circuit means adapted for control by said relay means and including said holding coil; said relay means being so constructed and arranged as to function, under control of said relay coil, to control said ignition grounding means and said holding coil circuit means; a time delay relay comprising, a pair of relatively engageable time delay relay points interposed in said ignition grounding means, means biasing said time delay relay points into relative disengaging relation, and an energizable time delay relay coil for effecting relative engagement of said time delay relay points; and circuit means for said time delay relay coil for maintaining said time delay relay points relatively engaged for only an appreciable predetermined time interval in response to closing of said kickdown switch.

10. A power transmission for driving a vehicle having an engine provided with an ignition system; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position thereof to a second position thereby to effect operation of said element from its said second position to its said first position, said thrust member being movable in a return direction from its said second position to its said first position to accommodate movement of said element to its said second position; power operating means for moving said thrust member from its said second position to its said first position; electromagnetic means comprising a flux-generating holding coil adapted, when energized, to releasably hold said thrust member in its said first position and, when deenergized, to release said thrust member for movement thereof to its said second position; a spring biasing said thrust member toward its said second position; a governor switch; means for controlling opening and closing of said governor switch as a function of vehicle drive speed such that said governor switch will close in response to bringing the vehicle to rest and will open in response to predetermined speed of drive of the vehicle; and ignition interrupter switch; means operable as a function of movement of said thrust member for controlling said interrupter switch such that said interrupter switch is closed when said thrust member is in its said first position and such that said interrupter switch opens in response to predetermined movement of said thrust member in its said thrust transmitting direction; a double pole relay comprising a pair of primary points and a pair of secondary points, one of the points of each pair being movable between positions of engagement and disengagement relative to the other point of such pair, said movable points being connected such that said pair of primary points is relatively engaged when said pair of secondary points are relatively disengaged and vice versa, a relay spring biasing said movable points to one of their positions aforesaid; and a relay coil adapted when energized to effect movement of said movable points to the other of their positions aforesaid; a governor relay coil circuit including a source of electrical energy, said relay coil, and said governor switch; ignition grounding means including said interrupter switch and one of said pairs of relay points; electrical holding coil circuit means including said holding coil and the other of said pairs of relay points; a time delay relay comprising, a pair of relatively engageable time delay relay points interposed in said ignition grounding means, means biasing said time delay relay points into relative disengaging relation, and an energizable time delay relay coil for effecting relative engagement of said time delay relay points; and circuit means for said time delay relay coil for maintaining said time delay relay points relatively engaged for only an appreciable predetermined time interval in response to closing of said governor switch.

11. A power transmission for driving a vehicle having an engine provided with an ignition system; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position thereof to a second position thereby to effect operation of said element from its said second position to its said first position, said thrust member being movable in a return direction from its said second position to its said first position to accommodate movement of said element to its said second position; power operating means for moving said thrust member from its said second position to its said first position; electromagnetic means comprising a flux-generating holding coil adapted, when energized, to releasably hold said thrust member in its said first position and, when deenergized, to release said thrust member for movement thereof to its said second position; a spring biasing said thrust member toward its said second position; a governor switch; means for controlling opening and closing of said governor switch as a function of vehicle drive speed such that said governor switch will close in response to bringing the vehicle to rest and will open in response to predetermined speed of drive of the vehicle; an ignition interrupter switch; means operable as a function of movement of said thrust member for controlling said interrupter switch such that said interrupter switch is closed when said thrust member is in its said first position and such that said interrupter switch opens in response to predetermined movement of said thrust member in its said thrust transmitting direction; a double pole relay comprising a pair of primary points and a pair of secondary points, one of the points of each pair being movable between positions of engagement and disengagement relative to the other point of such pair, said movable points being connected such that said pair of primary points is relatively engaged when said pair of secondary points are relatively disengaged and vice versa, a relay spring biasing said movable points to one of their positions aforesaid; and a relay coil adapted when energized to effect movement of said movable points to the other of their positions aforesaid; a governor relay coil circuit including a source of electrical energy, said relay coil, and said governor switch; ignition grounding means including said interrupter switch and one of said pairs of relay points; electrical holding coil circuit means including said holding coil and the other of said pairs of relay points; a time delay relay comprising, a pair of relatively engageable time delay relay points interposed in said ignition grounding means, means biasing said time delay points into relative disengaging relation, and an energizable time delay relay coil for effecting relative engagement of said time delay relay points; and circuit means for said time delay relay coil for maintaining said time delay relay points relatively engaged for only an appreciable predetermined time interval in response to closing of said kickdown switch.

12. In a power transmission for driving a vehicle having an engine provided with an ignition system and a throttle; relatively engageable drive control elements one being movable relative to the other to effect disengagement of said elements when operation of said ignition system is interrupted; a thrust member operable from a first position thereof to a second position thereof in transmitting thrust for moving said movable element as aforesaid; electromagnetic means comprising a flux-generating holding coil adapted, when energized, to releasably hold said thrust member in its said first position; a spring biasing said thrust member toward its said second position; a governor switch; means for controlling opening and closing of said governor switch as a function of vehicle drive speed such that said governor switch will close in response to bringing the vehicle to rest and will open in response to predetermined speed of drive of the vehicle; a kickdown switch biased to closed position; an accelerator pedal for controlling operation of said throttle; means controlled by said pedal for opening said kickdown switch in response to movement of said pedal in throttle-opening direction; an ignition interrupter switch; means operable as a function of movement of said thrust member for controlling said interrupter switch such that said interrupter switch is closed when said thrust member is in its said first position and such that said interrupter switch opens in response to predetermined movement of said thrust member in its said thrust transmitting direction; relay means comprising an energizable controlling relay coil; a pair of parallel arranged electric circuits each including a source of electrical energy and said relay coil, one of said pair of parallel arranged circuits including said governor switch and the other including said kickdown switch; ignition grounding means adapted for control by said relay means and including said interrupter switch; electrical holding coil circuit means adapted for control by said relay means and including said holding coil; said relay means being so constructed and arranged as to function, under control of said relay coil, to control said ignition grounding means and said holding coil circuit means; a time delay relay comprising, a pair of relatively engageable time delay relay points interposed in said ignition grounding means, means biasing said time delay relay points into relative disengaging relation, and an energizable time delay relay coil for effecting relative engagement of said time delay relay points; and circuit means for said time delay relay coil for maintaining said time delay relay points relatively engaged for only an appreciable predetermined time interval in response to closing of either of said governor or kickdown switches.

13. A power transmission according to claim 12; said circuit means for said time delay relay coil comprising, means for grounding one end of said time delay relay coil, means for electrically connecting the other end of said time delay relay coil with said holding coil circuit means, and a resistance grounded at one end and electrically connected at its other end to said other end of said time delay relay coil.

14. A power transmission according to claim 12; said circuit means for said time delay relay coil comprising, means for grounding one end of said time delay relay coil, means for electrically connecting the other end of said time delay relay coil with said pair of parallel circuits at the energy source side of said governor and kickdown circuits, and a resistance electrically interposed between said other end of said time delay relay coil and said energy source.

15. A power transmission for driving a vehicle having an engine provided with an ignition system and a throttle; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position thereof to a second position thereby to effect operation of said element from its said second position to its said first position, said thrust member being movable in a return direction from its said second position to its said first position to accommodate movement of said element to its said second position; power operating means for moving said thrust member from its said second position to its said first position; electromagnetic means comprising a flux-generating holding coil adapted, when energized, to releasably hold said thrust member in its said first position and, when de-energized, to release said thrust member for movement thereof to its said second position; a spring biasing said thrust member toward its said second position; a governor switch; means for controlling opening and closing of said governor switch as a function of vehicle drive speed such that said governor switch will close in response to bringing the vehicle to rest and will open in response to predetermined speed of drive of the vehicle; a kickdown switch biased to closed position; an accelerator pedal for controlling operation of said throttle; means controlled by said pedal or opening said kickdown switch in response to movement of said pedal in throttle-opening direction; an ignition interrupter switch; an interrupter switch spring biasing said interrupter switch to switch-open condition; a switch operating member adapted to close said interrupter switch; lost-motion means comprising a lost-motion spring operable disposed between said thrust member and said switch operating member, said lost-motion means being so constructed and arranged such that said lost-motion spring operates through said switch operating member to close said interrupter switch when said thrust member moves from its said second position to its said first position and such that said lost-motion spring will maintain said interrupter switch closed during a portion of the movement of said thrust member in its said thrust transmitting direction; relay means comprising an energizable controlling relay coil; a pair of parallel arranged electric circuits each including a source of electrical energy and said relay coil, one of said pair of parallel arranged circuits including said governor switch and the other including said kickdown switch; ignition grounding means adapted for control by said relay means and including said interrupter switch; electrical holding coil circuit means adapted for control by said relay means and including said holding coil; said relay means being so constructed and arranged as to function, under control of said relay coil, to control said ignition grounding means and said holding coil circuit means; a time delay relay comprising, a pair of relatively engageable time delay relay points interposed in said ignition grounding means, means biasing said time delay relay points into relative disengaging relation, and an energizable time delay relay coil for effective relative engagement of said time delay relay points; and circuits means for said time delay relay coil for maintaining said time delay relay points relatively engaged for only an appreciable predetermined time interval in response to closing of either of said governor or kickdown switches.

16. A power transmission for driving a vehicle having an engine provided with an ignition system; transmission change speed mechanism; an electrically energizable device for controlling speed change in said transmission mechanism; electrical circuit means, including a source of electrical energy, for controlling energization of said device; an ignition interrupter switch operable under control of said device; means under control of said interrupter switch for grounding said ignition system to facilitate operation of said change speed mechanism; a time delay relay comprising, a pair of relatively engageable relay points interposed in said ignition grounding means, and an energizable relay coil for controlling relative engagement and disengagement of said relay points; and circuit means for controlling energization of said relay coil whereby to effect grounding of said ignition system with time delay on restoring said ignition system to normal operation, comprising, means for grounding one end of said relay coil, means for electrically connecting the other end of said relay coil with said energy source; a governor switch; a vehicle driver controlled switch; means for controlling opening and closing of said electrically connecting means comprising a pair of parallel arranged circuits electrically connected to said energy source and respectively including said switches; said circuit means comprising a resistance electrically connected across the ends of said relay coil and adapted to expedite flow of inductive current through said relay coil when the last said electrically connecting means is broken.

17. A power transmission for driving a vehicle having an engine provided with an ignition system; transmission change speed mechanism; an electrically energizable device for controlling speed change in said transmission mechanism; electrical circuit means, including a source of electrical energy, for controlling energization of said device; ignition grounding means for said ignition system adapted to facilitate operation of said change speed mechanism; a time delay relay comprising, a pair of relatively engageable relay points interposed in said ignition grounding means, and an energizable relay coil for controlling relative engagement and disengagement of said relay points; and circuit means for controlling energization of said relay coil whereby to effect grounding of said ignition system with time delay on restoring said ignition system to normal operation, comprising, means for grounding one end of said relay coil, a resistance, means for electrically connecting the other end of said relay coil through said resistance to said energy source; and switch controlled means electrically connected to said electrically connecting means at a point between said resistance and said relay coil for grounding said other end of said coil, said resistance being adapted to so retard current flow from said energy source through said electrically connecting means, when said switch functions to ground said other end of said relay coil, as to prevent short circuiting said energy source through said electrically connecting means and said switch.

VICTOR E. MATULAITIS.

REFERENCES CITED

The following references are of record in the file of this patent:

UNITED STATES PATENTS

| Number | Name | Date |
|---|---|---|
| 2,257,838 | Claytor | Oct. 7, 1941 |
| 2,281,916 | Claytor | May 5, 1942 |